(12) United States Patent
Shaw

(10) Patent No.: US 6,234,872 B1
(45) Date of Patent: *May 22, 2001

(54) FREE FLOW ABRASIVE HOLE POLISHING

(75) Inventor: James S. Shaw, Hampton Falls, NH (US)

(73) Assignee: General Electric Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,672

(22) Filed: Dec. 21, 1998

(51) Int. Cl.[7] ........................................ B24B 1/00
(52) U.S. Cl. ................................ 451/36; 451/61
(58) Field of Search ...................... 451/36, 113, 104, 451/61, 64, 37

(56) References Cited

U.S. PATENT DOCUMENTS

| | | | |
|---|---|---|---|
| 3,699,725 | * 10/1972 | Feldcamp | 451/36 |
| 3,729,871 | * 5/1973 | Taylor | 451/36 |
| 3,823,514 | * 7/1974 | Tsuchiya | 451/36 |
| 4,203,257 | 5/1980 | Jamison et al. | |
| 4,512,859 | * 4/1985 | Inoue | 451/36 |
| 5,054,247 | * 10/1991 | Rhoades et al. | 451/36 |
| 5,247,766 | 9/1993 | Kildea . | |
| 5,702,288 | 12/1997 | Liebke et al. . | |
| 5,807,163 | * 9/1998 | Perry | 451/36 |

FOREIGN PATENT DOCUMENTS

363028566 * 2/1988 (JP) ........................................ 451/36

* cited by examiner

*Primary Examiner*—Robert A. Rose
(74) *Attorney, Agent, or Firm*—Andrew C. Hess; Gerry S. Gressel

(57) ABSTRACT

A free flow abrasive hole polishing system and method improves air flow and resultant component cooling efficiency for an apertured article. The free flow abrasive hole polishing system mixes an abrasive particle component with a carrier media to create a free flowing abrasive particle carrier media mixture. This mixture is pumped through apertures defined by aperture walls in the article to improve air flow and resultant cooling efficiency of the article. Since the abrasive particles have mass and velocity and the free flowing media does not have resistance to flow, the abrasive particles impinge on peaks of the aperture walls, predominantly removing high spots in the aperture walls.

20 Claims, 2 Drawing Sheets

FREE FLOW ABRASIVE HOLE POLISHING

TECHNICAL FIELD

The present invention relates to hole polishing and, more particularly, to a free flow abrasive hole polishing system for improving air flow and resultant component cooling efficiency.

BACKGROUND OF THE INVENTION

Currently there are many aircraft engine parts produced which have a large number of small holes for delivery of cooling air to protect the subject part from high temperature damage. In most cases, such parts have a hole size referenced on the drawing but the acceptance criteria is air flow (air passed through the subject holes per unit time). Because of the number of holes normally found in such parts and the required uniformity of air distribution, the tolerance on hole size is quite small. Many times such holes are undersized, or as specified, and do not deliver the required air flow. In such cases, the options for increasing hole size are limited and expensive.

Several approaches that have been used in the past are to process the holes through a re-drill operation at the high risk of generating scrap since locating and maintaining the exact centerline of the hole during re-drilling on many hundreds of holes is nearly impossible.

Another approach is to abrasive flow machine the holes. However, because the carrier has high resistance to flow, abrasive particles at the media-hole wall interface will remain at the surface. This results in material removal at both the peaks and valleys by the grinding action of the abrasives. Further disadvantages of this method include limited abrasive particles per unit time, considerable tooling cost, processing time, and in some cases destruction of parts due to distortion because of the high pressures required to move the process media (a putty-like substance containing abrasive particles) through the small holes.

These existing processes are expensive, time consuming, and have a high probability of causing the part to be scrapped.

It would be desirable, then, to be able to apply an improved abrasive hole polishing system which is not subject to the foregoing disadvantages. The objects, features and advantages of the present invention will become more readily apparent in the following description when taken in conjunction with the appended drawings.

SUMMARY OF THE INVENTION

The present invention provides a free flow abrasive hole or aperture polishing technique whereby the abrasive particle has integral mass and velocity and does not follow the carrier. The free flow abrasive hole polishing, according to the present invention, will apply to all components which have small air cooling apertures or holes which are undersize for the delivery of a specified air flow.

In accordance with the present invention, a free flow abrasive hole polishing system and method improves air flow and resultant component cooling efficiency for an apertured article. The free flow abrasive hole polishing system mixes an abrasive particle component with a carrier media to create a free flowing abrasive particle carrier media mixture. This mixture is pumped through apertures defined by aperture walls in the article to improve air flow and resultant cooling efficiency of the article. Since the abrasive particles have mass and velocity and the free flowing media does not have resistance to flow, the abrasive particles impinge on peaks of the aperture walls, predominantly removing high spots in the aperture walls.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with objects and advantages thereof, may best be understood by reference to the following description taken in conjunction with the accompanying drawings in which:

DETAILED DESCRIPTION OF THE INVENTION

Figure 1:
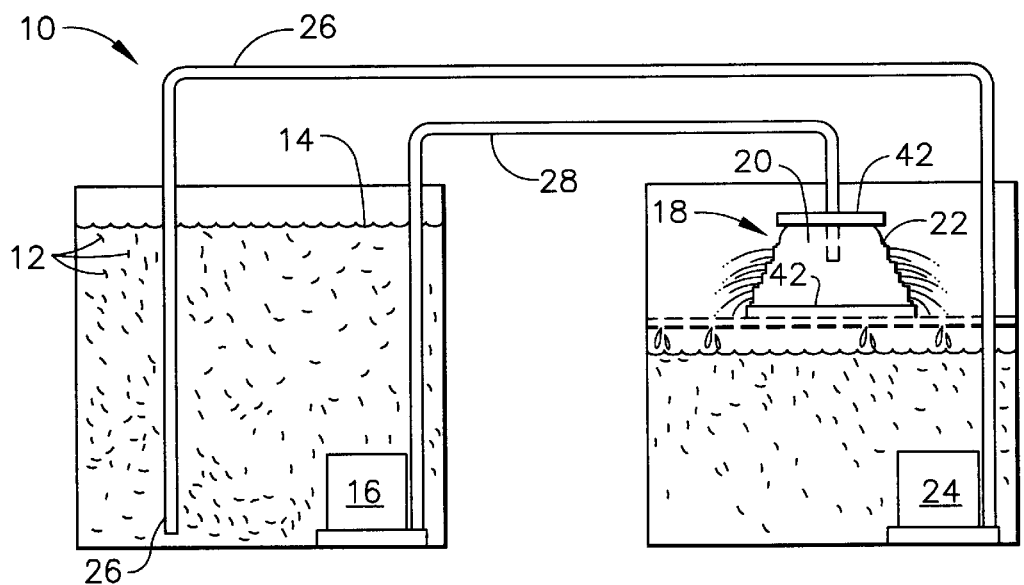
FIG. 1 illustrates the free flow abrasive aperture polishing technique of the present invention being applied to a component.

Referring to FIG. 1, there is illustrated a block diagram 10 of the free flow abrasive aperture or hole polishing technique, in accordance with the present invention. In this process, fine abrasive particles 12, or open cell polyurethane containing abrasive particles, are suspended by agitation in water or other free flowing media 14. The agitated grit is pumped via pump supply 16 through line 28 to component 18 which contains many small holes to be polished, and through the small undersized apertures 20, for the purpose of polishing the walls 22 of the small apertures 20 and enlarging the apertures 20.

Figure 2:
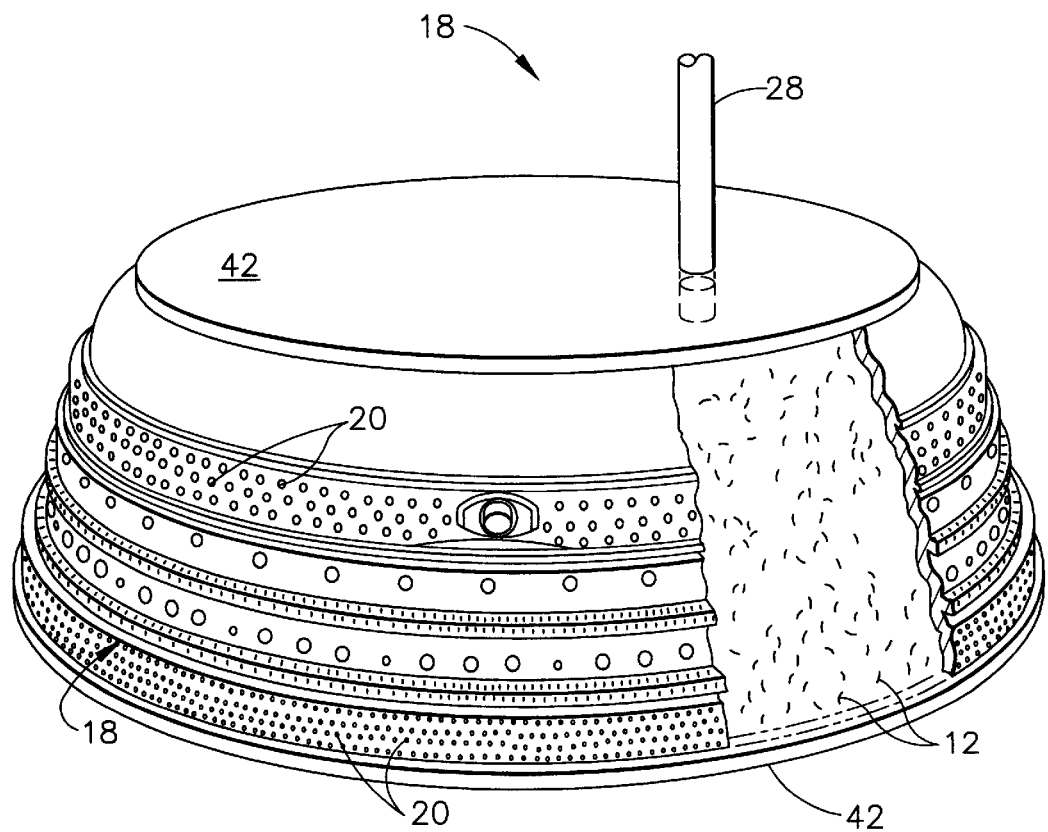
FIG. 2 illustrates an enlarged and partially cut away view of an aperture to be polished in accordance with the technique of the present invention.

Continuing with FIG. 1 and referring also to FIG. 2, component 18 of FIG. 1 is enlarged and partially cut away to further illustrate the abrasive hole polishing technique of the present invention. The result of such polishing is a significant reduction in the air turbulence as the air passes through the aperture 20. The end effect is that with reduced turbulence the air flow is increased and allows for the proper amount of cooling air to pass through the apertures and, thus, meet both the intent of the design relative to hole size and the requirements for air flow.

A return pump 24 in FIG. 1 continuously agitates the abrasive 12 via return line 26, shown in FIGS. 1 and 2. Since the abrasive particles 12 have mass and are carried by water 14 moving at high velocity, their effect on aperture wall imperfections is significantly increased over processes such as abrasive flow machining which uses a high viscosity media at high pressure to carry the abrasive particles.

Figure 3B:
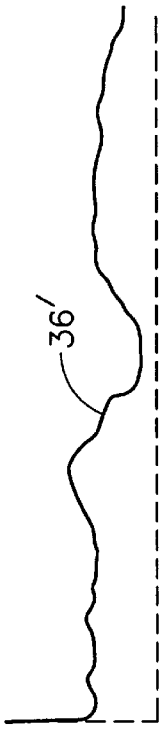
FIGS. 3A and 3B illustrate the "before" and "after" effects of prior art abrasive flow machining during which a completely new hole surface is generated which duplicates the original hole surface but translated, thus creating a larger hole.
Figure 3A:
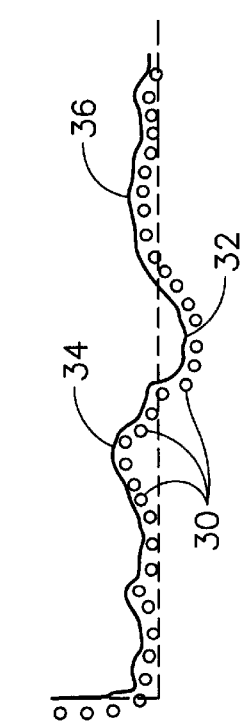

Abrasive flow machining effects are illustrated in FIGS. 3A and 3B, with "before" and "after" illustrations, respectively, to show the effect of abrasive flow machining on holes. Since abrasive flow machining media is high viscosity, and the carrier has high resistance to flow, the abrasive particles 30 at the media-hole wall interface will remain at the surface of the flow media, as illustrated in FIG. 3A, following the contour of the media-hole wall interface. This will result in material removal at peaks 32 and at valleys 34 of the hole wall 36. This is clearly indicated by comparing the hole wall 36 of FIG. 3A with the hole wall 36' of FIG. 3B. As seen, the grinding action of the abrasives 30 removed material along the entire length of the wall 36. Thus, the hole wall has been translated to a larger hole while maintaining the original wall profile.

Figure 4B:
FIGS. 4A and 4B illustrate the "before" and "after" effects of free flow abrasive aperture polishing in accordance with the present invention, which process generates only a partial new hole surface that does not duplicate the original hole surface since the predominant material removal occurs at the high points.
Figure 4A:
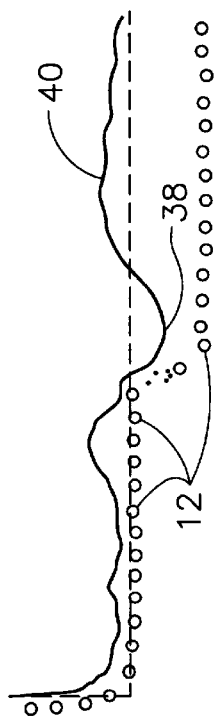

Turning now to FIGS. 4A and 4B, the "before" and "after" comparisons of application of the free flow abrasive aperture polishing technique of the present invention are illustrated. In accordance with the technique of the present invention, the abrasive particles 12 have mass and velocity. Because the abrasive particles 12 have mass and velocity and are carried by a free flowing media, rather than a carrier with high resistance to flow, the abrasive particles will not perfectly follow the carrier. The advantage of this is that the abrasive particles will impinge only on peaks 38 of the aperture wall 40, thereby predominantly removing high spots on the aperture wall 40 by the impingement of particles 12, as illustrated by comparing FIG. 4A with FIG. 4B. The number of abrasive particles passing through the hole per unit time is also significantly increased using this process, as opposed to abrasive flow machining, because of the ability of the carrier media 14 to flow.

With the free flow abrasive aperture polishing technique of the present invention, there is no danger of distorting the part 18, since the carrier media pressures required to facilitate the process are low. Fixturing is reduced as well, since in many parts processed by free flow abrasive aperture or hole polishing, the part 18, in fact, is the fixture, with top and bottom enclosure plates 42, as best illustrated in FIG. 2. When holes not needing to be processed are part of a matrix of a large number of holes, the non-processed holes may simply be taped or otherwise covered to prevent access by the carrier media and abrasive particles, since the technique involves comparatively low carrier pressures.

During the free flow abrasive hole polishing, aperture size is only minutely changed. The result of processing parts through free flow abrasive hole polishing is to polish the aperture wall and remove high points in the aperture wall which cause the passing air to trip and create turbulence and, thereby, air flow is reduced.

The free flow abrasive hole polishing technique of the present invention is useful for all components which have small air cooling apertures or holes which are under size for the delivery of a specified air flow. For example, there are many aircraft engine parts where a hole edge radius is not desirable. Since there is little restraint on the abrasive particle from movement in the water carrier, hole radiusing is significantly less than with conventional abrasive flow machining using high pressure and high viscosity media. One of the main results of processing parts through abrasive flow machining is to generate radii at hole entrances. Hence, the application of free flow abrasive hole polishing in accordance with the present invention, results in a significant reduction in the radius generated at the hole entrance as well as a reduction in air turbulence as the air passes through the aperture. The end effect is that with reduced turbulence the air flow is increased and allows for the proper amount of cooling air to pass through the apertures.

The process of free flow abrasive hole polishing will result in reducing the high spots in the aperture wall while not significantly affecting the low spots in the wall. Furthermore, the reduction of the high spots in the aperture wall will cause the passing air in the finished part not to "trip". The reduction in tripped air passing though the apertures will reduce or eliminate turbulence. The reduction in air turbulence will result in increased air flow.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

I claim:

1. A method of internally polishing a plurality of undersized cooling air apertures in a hollow aircraft engine part having a common inlet disposed in flow communication with said plurality of apertures, with said inlet and apertures being relatively large and small, respectively, said method comprising:

fixturing said part to close said large inlet and create a closed vessel disposed in flow communication with said plurality of small apertures;

pumping into said vessel through said fixtured inlet an abrasive and liquid mixture; and discharging said mixture from said vessel simultaneously and unidirectionally through said plurality of apertures for impinging upon and abrading any aperture wall high spots therein for internally polishing said apertures to reduce air turbulence in said apertures and increase airflow therethrough.

2. A method according to claim 1 further comprising pumping said mixture into said vessel to fill said vessel therewith for simultaneously discharging said mixture through said apertures.

3. A method according to claim 2 further comprising pumping said mixture into said vessel under pressure selected to prevent distortion of said part.

4. A method according to claim 1 further comprising suspending said abrasive in said liquid to create a free flowing mixture thereof for permitting said abrasive to impinge predominantly upon said high spots inside said apertures with relatively little abrading affect on any low spots in said walls thereof.

5. A method according to claim 4 further comprising agitating said abrasive in said liquid for suspending said abrasive therein for flow through said apertures.

6. A method according to claim 1 wherein:

said part is fixtured by closing said part with a fixture plate abutting against said large inlet to form said vessel; and said mixture is pumped through said plate and into said part for discharge simultaneously through said apertures.

7. A method according to claim 6 further comprising pumping said mixture into said part to fill said part therewith under a pressure selected to prevent distortion of said part as said mixture is simultaneously discharged through said apertures.

8. A method according to claim 1 further comprising covering some of said apertures to prevent flow of said mixture therethrough.

9. A method according to claim 1 further comprising forming said mixture of abrasive and liquid to permit free flow of said abrasive therein for minimizing radiusing at inlets of said apertures through which said mixture is admitted.

10. A method according to claim 1 wherein said abrasive comprises cellular polyurethane containing abrasive particles.

11. A method according to claim 1 wherein said liquid comprises water.

12. A method of internally polishing a plurality of undersized cooling air apertures in hollow aircraft engine part having a common inlet disposed in flow communication with said plurality of apertures, with said inlet and apertures being relatively large and small, respectively, said method comprising:

closing said hollow part with a fixture plate abutting against said large inlet to create a closed vessel disposed in flow communication with said plurality of small apertures;

pumping an abrasive and liquid mixture through an elongate supply line through said plate and into said vessel; and discharging said mixture from said vessel simultaneously and unidirectionally through said plurality of apertures for impinging upon and abrading any aperture wall high spots therein for internally polishing said apertures to reduce air turbulence in said apertures and increase airflow therethrough.

13. A method according to claim 12 further comprising pumping said mixture into said vessel to fill said vessel therewith under a pressure selected to prevent distortion of said part as said mixture is simultaneously discharged through said apertures.

14. A system for internally polishing a plurality of undersized cooling air apertures in a hollow aircraft engine part having a common inlet disposed in flow communication with said plurality of apertures, with said inlet and apertures being relatively large and small, respectively, said system comprising:

means for fixturing said part to close said large inlet and create a closed vessel disposed in flow communication with said plurality of small apertures;

an abrasive particle carrier media mixture including an abrasive particle component suspended in a liquid carrier media; and means for pumping into said vessel through said fixtured inlet said abrasive and liquid mixture for simultaneous and unidirectional discharge through said plurality of apertures for impinging upon and abrading any aperture wall high spots therein for internally polishing said apertures to reduce air turbulence in said apertures and increase airflow therethrough.

15. A system according to claim 14 further comprising means for collecting said mixture discharged from said part and returning said collected mixture to said pumping means in a closed loop for re-delivery to said vessel.

16. A polishing system as claimed in claim 14 wherein the abrasive particle component comprises an open cell polyurethane containing abrasive particles.

17. A polishing system as claimed in claim 14 wherein the carrier media comprises water.

18. A polishing system as claimed in claim 14 wherein the means for pumping the abrasive particle flow media mixture comprises a return pump for continuously agitating the abrasive particle carrier media mixture.

19. A polishing system as claimed in claim 18 wherein the means for pumping the abrasive particle flow media mixture further comprises a return line for establishing a closed loop system for continuous use of abrasive particles in the carrier media.

20. A polishing system as claimed in claim 19 wherein the return line cooperates with said return pump to agitate said mixture and maintain in suspension the abrasive particles in the carrier media.

* * * * *